United States Patent
Hopkins et al.

(10) Patent No.: US 7,543,691 B2
(45) Date of Patent: Jun. 9, 2009

(54) BRAKE ROTOR ASSEMBLY

(75) Inventors: Eunjoo C. Hopkins, Farmington Hills, MI (US); Patrick N. Hopkins, Farmington Hills, MI (US); Thomas V. Valvano, Saginaw, MI (US); Jerome A. Limpach, Tipp City, OH (US); Eric W Jesme, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 401 days.

(21) Appl. No.: 11/485,605

(22) Filed: Jul. 12, 2006

(65) Prior Publication Data

US 2008/0011561 A1 Jan. 17, 2008

(51) Int. Cl.
*F16D 65/12* (2006.01)
(52) U.S. Cl. ................................. 188/218 XL
(58) Field of Classification Search ................ 188/71.4, 188/71.5, 218 XL
See application file for complete search history.

(56) References Cited

U.S. PATENT DOCUMENTS

| | | | | |
|---|---|---|---|---|
| 2,767,817 | A * | 10/1956 | Davis | 188/218 XL |
| 3,726,374 | A * | 4/1973 | Warren et al. | 188/218 XL |
| 3,920,108 | A * | 11/1975 | Ely | 188/218 XL |
| 4,540,067 | A | 9/1985 | Meynier | |
| 5,109,960 | A * | 5/1992 | Gunther | 188/218 XL |
| 5,558,186 | A * | 9/1996 | Hyde et al. | 188/218 XL |
| 5,779,006 | A * | 7/1998 | Hyde et al. | 188/71.5 |
| 5,823,303 | A | 10/1998 | Schwarz et al. | |
| 5,862,892 | A | 1/1999 | Conley | |
| 6,352,141 | B1 * | 3/2002 | Wendt | 188/218 XL |
| 6,626,273 | B1 | 9/2003 | Baumgartner et al. | |
| 2004/0035659 | A1 | 2/2004 | Pacchiana et al. | |
| 2004/0040803 | A1 | 3/2004 | Debus et al. | |
| 2004/0140164 | A1 | 7/2004 | Burgoon et al. | |
| 2005/0194224 | A1 | 9/2005 | Burgoon et al. | |
| 2006/0016646 | A1 * | 1/2006 | Banks et al. | 188/218 XL |

FOREIGN PATENT DOCUMENTS

EP 1092889 A1 * 4/2001
JP 02-107835 4/1990

OTHER PUBLICATIONS

English language Abstract for JP 02-107835 extracted from *Searching PAJ* database dated Oct. 26, 2005.

* cited by examiner

*Primary Examiner*—Thomas J Williams
(74) *Attorney, Agent, or Firm*—Thomas N. Tworne

(57) ABSTRACT

A brake rotor assembly for a dual brake disc braking system includes an annular ring having a plurality of teeth. The teeth are disposed radially about a central axis of the annular ring, and extend inward toward the central axis. The teeth are for slideably engaging a hub (wheel end) having a plurality of channels. The annular ring includes a plurality of pins extending outwardly from the annular ring. A friction disc is disposed radially about the annular ring, and is in interlocking engagement with the plurality of pins. The annular ring and the plurality of teeth are integrally cast from a high strength corrosion resistant material having a tensile strength greater than 260 megapascals to resist fracture during high stress braking conditions and high thermal loads. The friction disc is cast around the annular ring from a grey cast iron.

5 Claims, 4 Drawing Sheets

BRAKE ROTOR ASSEMBLY

BACKGROUND OF THE INVENTION

1. Field of the Invention

The subject invention relates to a brake rotor assembly for a disc braking system of a vehicle, and further relates to a method of producing the brake rotor assembly.

2. Description of the Prior Art

Disc braking systems for vehicles utilize a brake caliper to urge a pair of brake pads into frictional engagement with a brake rotor (brake disc) to provide a braking force to the vehicle. In order to increase the braking force applied by the disc braking system, it is known to incorporate a second brake rotor into the disc braking system. This may be referred to as a dual disc braking system. The dual disc braking system necessitates that a first brake rotor be slideable along a central axis relative to a second brake rotor. The first brake rotor slides over and rotates with a hub (wheel end or axle). The slideable first brake rotor compensates for wear in the brake pads over time. Accordingly, as the brake pads wear, the first brake rotor slides over the hub along the central axis to compensate for the wear in the brake pads. The slideable first brake rotor typically includes teeth extending inwardly from an inner periphery of the first brake rotor toward the central axis. The teeth are disposed radially about the central axis for engaging channels in the wheel hub for transmitting rotational movement therebetween. The teeth may be integrally cast with the first brake rotor. Typically, the brake rotor and the teeth are cast integrally together from a grey cast iron. However, the grey cast iron tends to fracture under certain high stress braking conditions and high thermal loads generated by the frictional engagement between the brake pads and the brake disc. Additionally, the grey cast iron tends to corrode at the toothed engagement between the teeth of the brake rotor and the groove in the hub, thereby bonding the brake rotor to the hub.

Alternatively, as disclosed in U.S. Pat. No. 4,540,067 (the '067 patent), the first brake rotor may be an assembly wherein an annular ring forms the teeth and is attached to a friction disc by a plurality of bolts. This type of assembly is often referred to as a composite brake rotor. The composite brake rotor, as assembled in the '067 patent, utilizes a portion of the friction disc to attach the annular ring thereto, thereby reducing a contact area between the brake pads and the friction disc and reducing the braking force provided by the disc braking system.

U.S. Pat. No. 5,109,960 (the '960 patent) discloses a method of producing a composite brake rotor. The method includes casting a hub to include a supporting ring extending radially outward from the hub. The hub is bolted to a wheel end, but is not slideable thereon. The supporting ring includes depressions extending across the supporting ring. The hub is placed in a mold, with a pair of parallel friction discs then being cast around the hub. The pair of friction discs include a plurality of webs extending therebetween. The plurality of webs interlock with the plurality of depressions in the supporting ring to interlock the friction discs and the hub. The hub is preferably cast from grey cast iron.

U.S. Pat. No. 5,823,303 (the '303 patent) also discloses a composite brake rotor. The brake rotor of the '303 patent includes a hub having a plurality of pins extending outwardly away from a central axis and disposed radially about the hub. The hub is bolted to a wheel end, but is not slideable thereon. A friction disc is cast around the hub, with the plurality of pins in interlocking engagement with the friction disc. As disclosed in the '303 patent, the hub and the plurality of pins may be integrally cast from gray cast iron. Alternatively, the hub may be formed from steel. When the hub is formed from steel, the plurality of pins may be formed from a high grade steel, such as stainless steel, and connected to the hub by welding or bonding.

Accordingly, there remains a need for a brake rotor suitable for use in a dual brake disc system having a plurality of teeth of sufficient strength to resist fracture while maximizing the contact area between the brake pads and the friction disc.

SUMMARY OF THE INVENTION AND ADVANTAGES

The subject invention provides a brake rotor assembly for a disc braking system. The assembly comprises an annular ring including a plurality of teeth extending inwardly toward a central axis and disposed radially about the central axis for slideably engaging a hub having a plurality of grooves. A plurality of pins is disposed on the annular ring, extending outwardly away from the central axis, and is disposed radially about the central axis. A friction disc is disposed radially about the annular ring, and is in interlocking engagement with the plurality of pins. The annular ring and the plurality of teeth include a material having a tensile strength greater than 260 megapascals.

The subject invention also provides a method of producing the brake rotor assembly. The method comprises the steps of casting the annular ring from the material having a tensile strength greater than 260 megapascals to form the plurality of teeth integrally with the annular ring; and forming the friction disc radially about the integrally cast annular ring and plurality of teeth.

Accordingly, the subject invention provides an improved composite brake rotor assembly suitable for use in a dual disc braking system. The high tensile strength material, having a tensile strength greater than 260 megapascals and forming the annular ring and the plurality of teeth, permit the brake rotor assembly to resist fracture under high stress braking conditions and high thermal loads. Additionally, the contact area between the friction disc and the brake pads is maximized by casting the friction disc around the annular ring instead of bolting the annular ring to the friction disc. The casting of the friction disc around the annular ring permits the contact area to extend all the way to the annular ring adjacent the plurality of teeth, without loosing any of the contact area to a bolted connection connecting the annular ring to the friction disc.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
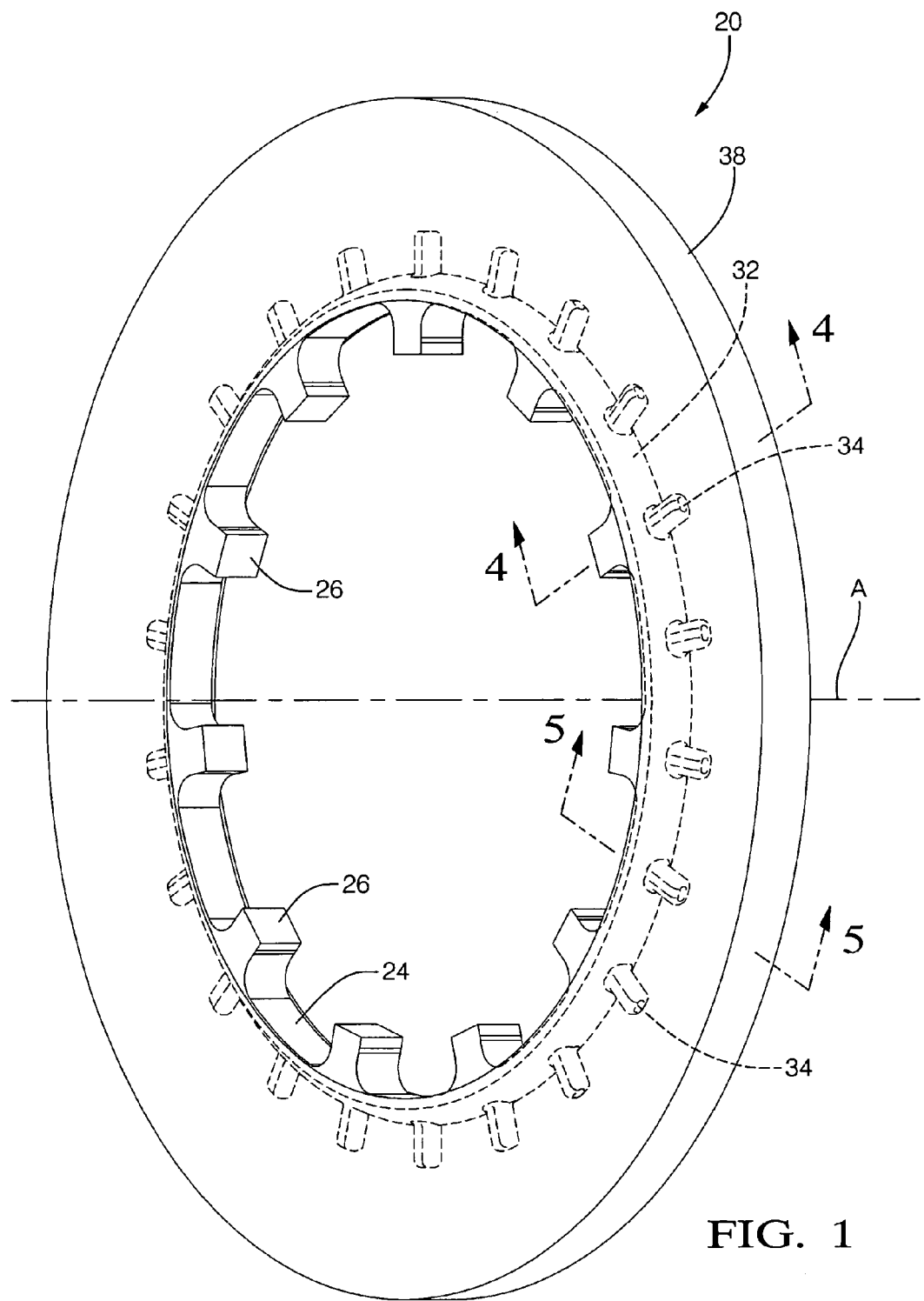
FIG. 1 is a perspective view of a brake rotor assembly.
Figure 2:
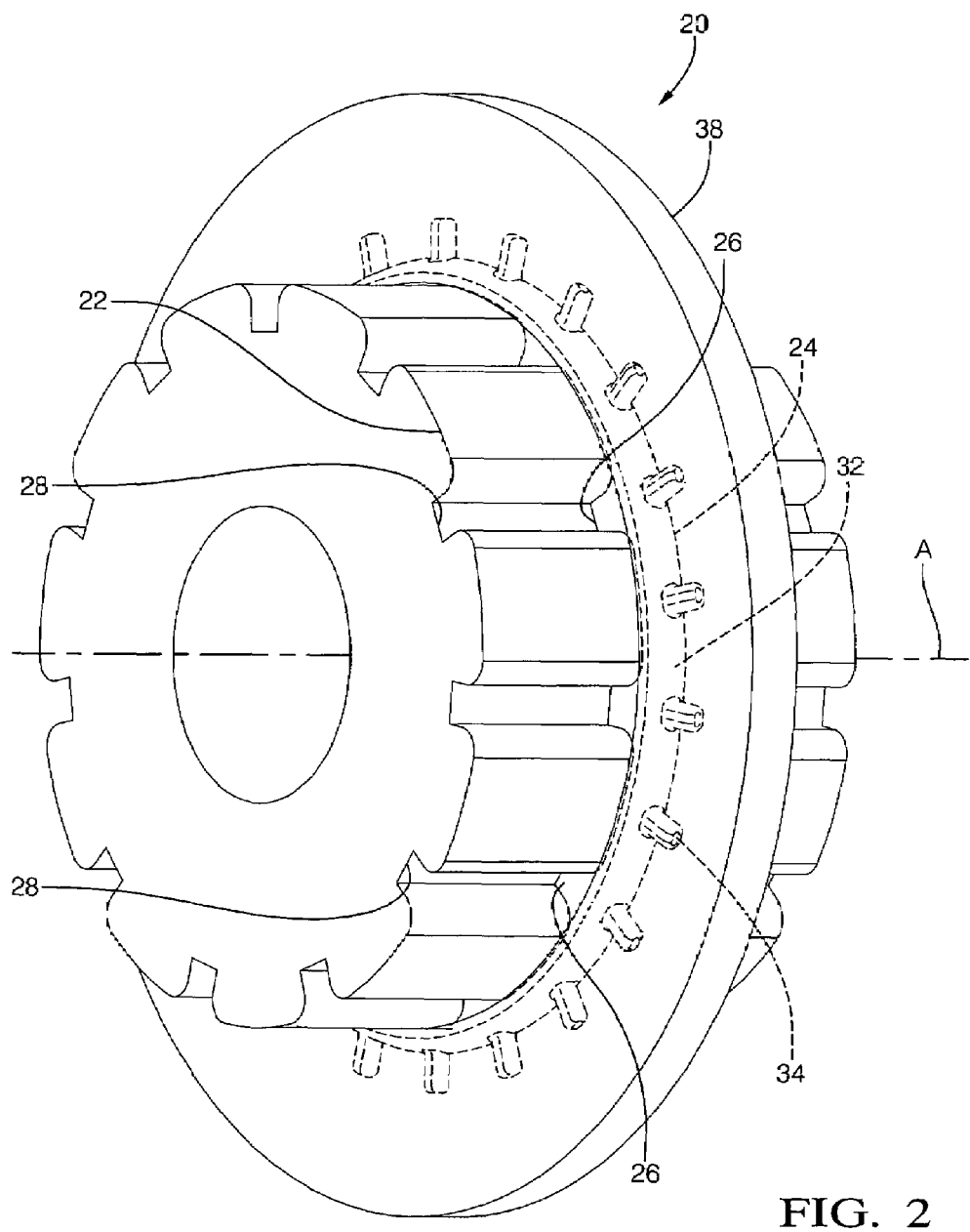
FIG. 2 is a perspective view of the brake rotor assembly disposed on a hub.

Referring to the Figures, wherein like numerals indicate corresponding parts throughout the several views, a brake rotor assembly is generally shown at 20 in FIGS. 1 and 2. The brake rotor assembly 20 is utilized in a disc braking system for a vehicle. The disc braking system operates as is known in the art, and includes a brake caliper (not shown) for urging a pair of brake pads (not shown) into frictional engagement with the brake rotor assembly 20. The brake rotor assembly 20 is mounted to a hub 22 (wheel end or axle) by a splined connection as described below for rotation with the hub 22. As is known with the disc braking system, the frictional engagement between the brake rotor assembly 20 and the brake pads supply a stopping force, transmitted through the brake rotor assembly 20 to the hub 22, to slow the vehicle.

Figure 4:
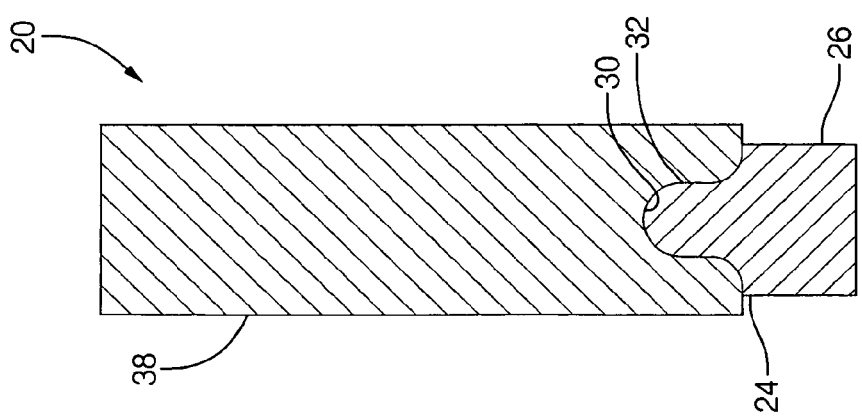
FIG. 4 is a cross-sectional view cut along section line 4-4 shown in FIG. 1 of the brake rotor assembly showing a rib of the annular ring engaged with a groove of a friction disc.

The brake rotor assembly 20 includes an annular ring 24. The annular ring 24 includes a plurality of teeth 26 extending inwardly toward a central axis A, with the plurality of teeth 26 being disposed radially about the central axis A. The hub 22 includes a plurality of channels 28 complimentary in configuration to the plurality of teeth 26; with the plurality of teeth 26 slideably engaged within the channels 28 of the hub 22. As best shown in FIG. 4, the annular ring 24 and the plurality of teeth 26 are integrally formed together in a casting process.

Figure 3:
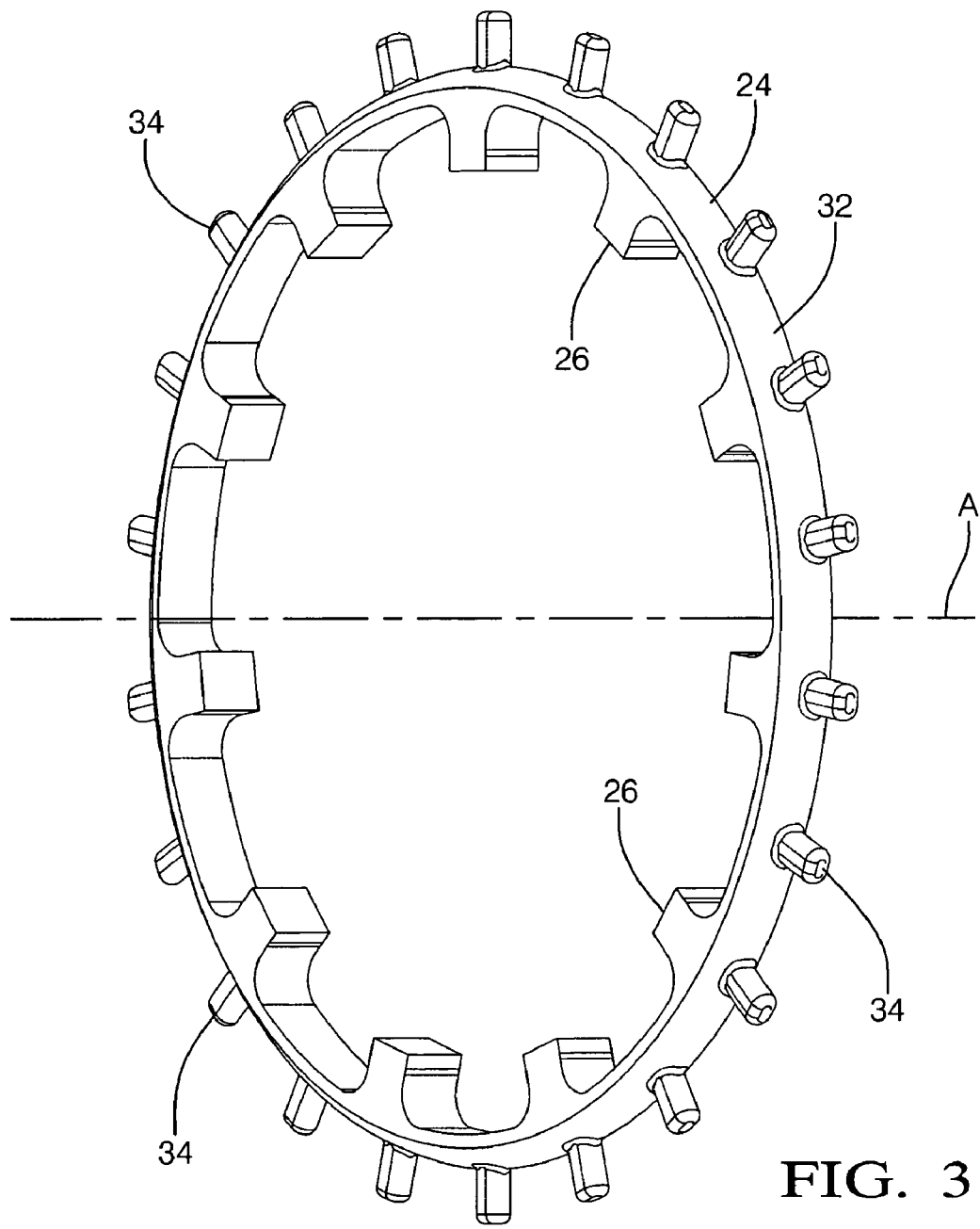
FIG. 3 is a perspective view of an annular ring of the brake rotor assembly.

As also shown in FIG. 3, the annular ring 24 further includes a rib 32 disposed around an outer periphery of the annular ring 24. The rib 32 is disposed at an approximate midsection of the outer periphery of the annular ring 24. Accordingly, the annular ring 24 may include a generally thin cross-section near the outer edges of the annular ring 24, with the rib 32 having a larger cross section near the middle of the annular ring 24. The rib 32 increases a bending/shear strength of the annular ring 24 to help prevent the annular ring 24 from fracturing during use, while still allowing for the generally thin cross section near the outer edges of the annular ring 24.

Continuing with FIGS. 1 through 3, a plurality of pins 34 is disposed on the annular ring 24, and extend outwardly away from the central axis A. The plurality of pins 34 is disposed radially about the central axis A, with the rib 32 of the annular ring 24 extending between the plurality of pins 34. Preferably, the plurality of pins 34 are integrally formed with the annular ring 24 and the plurality of teeth 26 during a shaping process. Alternatively, as shown in FIG. 6, a plurality of recesses 36 are bored in to the annular ring 24, through the rib 32, and the plurality of pins 34 are pressed into the plurality of recesses 36.

As best shown in FIGS. 1, 2, 4, and 5, a friction disc 38 is disposed radially about the outer periphery of the annular ring 24, and is in interlocking engagement with the plurality of pins 34. Accordingly, the annular ring 24 and the friction disc 38 are separate components, with the plurality of pins 34 and the rib 32 aligning the friction disc 38 relative to the annular ring 24. It should be understood that as the friction disc 38 is formed around the outer periphery of the annular ring 24. The friction disc 38 also defines a plurality of pockets 40 for receiving the plurality of pins 34. The friction disc 38 further defines a groove 30 in interlocking engagement with the rib 32 of the annular ring 24.

Figure 6:
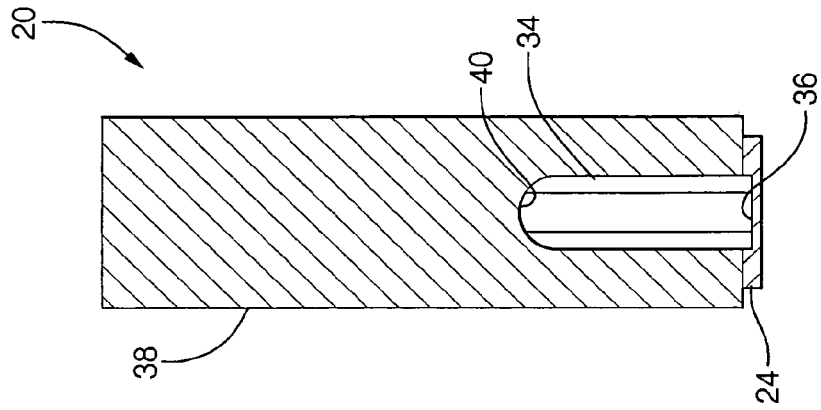
FIG. 6 is an alternative embodiment of the cross sectional view of FIG. 5 showing the brake rotor assembly with one of the plurality of pins pressed into the annular ring, and engaged with the recess of the friction disc.
Figure 5:
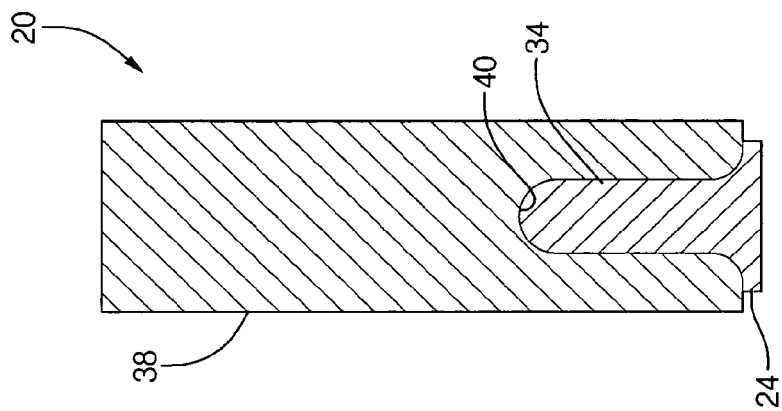
FIG. 5 is a cross sectional view cut along section line 5-5 shown in FIG. 1 of the brake rotor assembly showing one of a plurality of pins integrally cast with the annular ring, and engaged with a recess of the friction disc.

As best shown in FIG. 4 through 6, the plurality of pins 34 and the rib 32 align and interconnect the friction disc 38 to the annular ring 24, with the friction disc 38 extending to the outer edges of the annular ring 24. Because the brake rotor assembly 20 does not utilize a bolted connection between the friction disc 38 and the annular ring 24 as shown in the prior art, the friction disc 38 is therefore able to extend around the rib 32 and into abutting engagement with the relatively thin cross section of the annular ring 24. This permits an increase in a contact area between the friction disc 38 and the brake pads.

The annular ring 24 and the plurality of teeth 26 include a high strength material having a tensile strength greater than 260 megapascals, and preferably a corrosion resistance less than 80 milligrams per hour. The tensile strength, as referred to herein, is the greatest longitudinal stress a substrate can bear without breaking. The corrosion resistance is measured by a weight loss during a pre-determined period of time while exposed to saltwater at 25 degrees Celsius. When the annular ring 24, the plurality of teeth 26, and the plurality of pins 34 are integrally formed together, the plurality of pins 34 will also include the high strength material. The high strength material is preferably stainless steel, however it should be understood that some other material meeting the material characteristics described above may also be used to practice the subject invention. It should also be understood that if the plurality of pins 34 are not integrally formed with the annular ring 24 and the plurality of teeth 26, then the plurality of pins 34 may not be formed of the high strength material.

Preferably, the friction disc 38 is formed from a gray cast iron material. However, it should be understood that the friction disc 38 may also be formed from some other material suitable for use as a brake disc in the disc braking system, such as a ceramic material.

The subject invention also provides a method of producing the brake rotor assembly 20. The method comprises the steps of shaping the annular ring 24 from a material having a tensile strength greater than 260 megapascals to form the plurality of teeth 26 integrally with the annular ring 24. The step of shaping the annular ring 24 may include a casting process, a forging process, or a machining process. It should be understood that some other manufacturing process may also be utilized to shape the annular ring 24.

As discussed above, the plurality of pins 34 may be integrally shaped with the annular ring 24 and the plurality of teeth 26. The high strength material used to shape the annular ring 24, the plurality of teeth 26, and if desired the plurality of pins 34 includes a tensile strength greater than 260 megapascals. Preferably, the high strength material also includes a corrosion resistance less than 80 milligrams per hour, wherein the corrosion resistance is measured by a weight loss during a pre-determined period of time while exposed to saltwater at 25 degrees Celsius.

If the plurality of pins 34 is not integrally shaped with the annular ring 24 and the plurality of teeth 26, then the method further comprises the step of placing the plurality of pins 34 on the annular ring 24. The step of placing the plurality of pins 34 into the annular ring 24 further comprises the steps of drilling a plurality of recesses 36 into the annular ring 24, and pressing the plurality of pins 34 into the plurality of recesses 36. Alternatively, the plurality of pins 34 may be bonded or otherwise affixed to the annular ring 24.

The method further comprises the step of forming the friction disc 38 radially about the integrally cast annular ring 24 and the plurality of teeth 26. When the friction disc 38 is formed from the ceramic material, the method further comprises the step of curing the friction disc 38 formed about the annular ring 24. The curing process will vary dependent upon the type of material utilized for the friction disc 38. When the friction disc 38 is formed from the gray cast iron material, the step of forming the friction disc 38 radially about the annular ring 24 is further defined as casting the friction disc 38 about the annular ring 24.

The method further comprises the step of heating the annular ring 24 and the plurality of pins 34 prior to casting the friction disc 38 to pre-stress the annular ring 24. In this manner, the annular ring 24 and the plurality of pins 34 will be hot when the friction disc 38 is formed. Heating the annular ring 24 and the plurality of pins 34 causes the annular ring 24 and the plurality of pins 34 to expand due to thermal expansion. The annular ring 24 remains in the expanded state as the friction disc 38 is formed around the annular ring 24. Accordingly, both the annular ring 24 and the plurality of pins 34 shrink during cooling, reducing a compressive stress that the friction disc 38 exerts on the annular ring 24, i.e., because the annular ring 24 is in the expanded state when the friction disc 38 is cast, the relative difference in the amount that the annular ring 24 and the friction disc 38 shrink is reduced, thereby reducing he compressive stress exerted on the annular ring 24 by the friction disc 38 as the friction disc 38 shrinks during cooling. It should be noted that the plurality of pins 34 extend radially outward from the annular ring 24 along a straight path. This allows for the radial expansion of the friction disc 38 when heated during use, without stressing the annular ring 24 or the plurality of pins 34 further.

The method further comprises the step of heating the assembly 20 after casting the friction disc 38 around the annular ring 24 to relieve any internal stresses in the assembly 20. The internal stresses in the assembly 20 may lead to fracture of the annular ring 24 during use. Heat treating processes for relieving the internal stresses present in the assembly 20 are well known in the art, and not described in detail herein.

The method further comprises the step of milling the plurality of teeth 26, a first side surface and a second side surface of the friction disc 38 to a final shape. Milling the first side surface and the second side surface of the friction disc 38 is further defined as turning the first side surface and the second side surface of the friction disc 38. The final shape is milled after the rotor assembly 20 has been heat treated to relieve any internal stresses. FIG. 4 shows the friction disc 38 before the milling process, with the first side and the second side of the friction disc 38 extending past the annular ring 24. FIGS. 5 and 6 show the friction disc 38 after the milling process, with the first side and the second side of the friction disc 38 milled flush with the annular ring 24. Preferably, the plurality of teeth 26 is milled to the final shape after the first side and the second side of the friction disc 38 has been milled to the final shape. The plurality of teeth 26 must be precisely shaped. Therefore, it is important that the teeth 26 are milled after the first and second side surfaces of the friction disc 38 have been milled to avoid altering the final shape of the plurality of teeth 26. Alternatively, it should be understood that the plurality of teeth 26 may be milled before the first and second side surfaces of the friction disc 38. Milling and turning processes are well known in the art and are not described in detail herein.

The foregoing invention has been described in accordance with the relevant legal standards; thus, the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. A method of producing a brake rotor assembly including an annular ring having a plurality of teeth extending inwardly toward and disposed radially about a central axis of the annular ring and further having a friction disc extending outwardly from the annular ring away from the central axis, said method comprising the steps of:
    shaping the annular ring from a material having a tensile strength greater than 260 megapascals to form the plurality of teeth integrally with the annular ring; and
    forming the friction disc radially about the integrally cast annular ring and plurality of teeth;
    wherein the assembly further includes a plurality of pins extending outwardly from the annular ring away from the central axis and the method further comprises the step of placing the plurality of pins on the annular ring;
    wherein the step of placing the plurality of pins on the annular ring further comprises the step of drilling a plurality of recesses into the annular ring.

2. A method as set forth in claim 1 wherein the step of placing the plurality of pins on the annular ring further comprises the step of pressing the plurality of pins into the plurality of recesses.

3. A method of producing a brake rotor assembly including an annular ring having a plurality of teeth extending inwardly toward and disposed radially about a central axis of the annular ring and further having a friction disc extending outwardly from the annular ring away from the central axis, said method comprising the steps of:
    shaping the annular ring from a material having a tensile strength greater than 260 megapascals to form the plurality of teeth integrally with the annular ring; and
    casting the friction disc radially about the integrally cast annular ring and plurality of teeth;
    further comprising the step of heating the annular ring and the plurality of pins prior to casting the friction disc.

4. A method as set forth in claim 3 further comprising the step of heating the assembly after casting the friction disc around the annular ring to relieve internal stresses in the assembly.

5. A method as set forth in claim 4 further comprising the step of milling the plurality of teeth and a first side surface and a second side surface of the friction disc to a final shape.

* * * * *